(No Model.)
C. P. GILMORE.
SPRAYING NOZZLE.
No. 578,400. Patented Mar. 9, 1897.
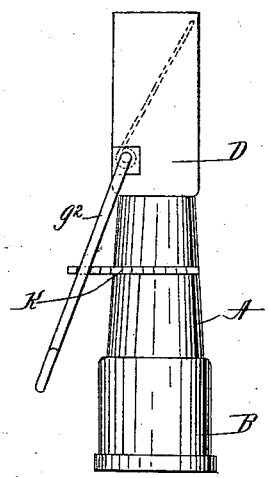
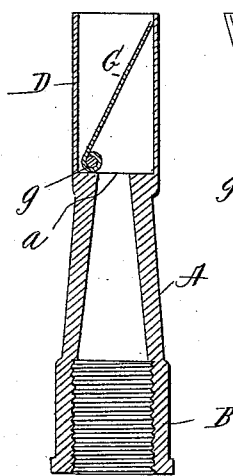
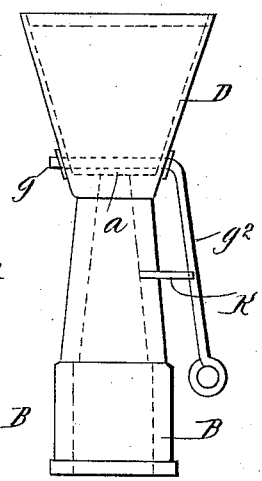
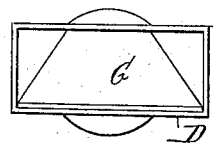
WITNESSES:
John Buckler,
C. Gersh
INVENTOR
Charles P. Gilmore,
BY
Edgar Tate & Co
ATTORNEYS.

UNITED STATES PATENT OFFICE.

CHARLES PITT GILMORE, OF CHILLICOTHE, OHIO.

SPRAYING-NOZZLE.

SPECIFICATION forming part of Letters Patent No. 578,400, dated March 9, 1897.

Application filed March 18, 1896. Serial No. 583,728. (No model.)

*To all whom it may concern:*

Be it known that I, CHARLES PITT GILMORE, a citizen of the United States, and a resident of Chillicothe, in the county of Ross and State of Ohio, have invented certain new and useful Improvements in Spraying-Nozzles, of which the following is a specification, reference being had to the accompanying drawings, forming a part thereof, in which similar letters of reference indicate corresponding parts.

This invention relates to spraying-nozzles, such as are usually employed for watering lawns, gardens, &c., and for fountains and other purposes; and the object of the invention is to provide an improved device of this class having a nozzle which is preferably oblong in cross-section and provided with a valve whereby the water is discharged from the nozzle in a thin sheet, the volume of which may be increased or decreased, as desired; and with this and other objects in view the invention consists in the construction, combination, and arrangement of parts hereinafter described and claimed.

The invention is fully disclosed in the following specification, of which the accompanying drawings form a part, in which—

Figure 1 is a side view of my improved nozzle; Fig. 2, a central vertical section thereof; Fig. 3, a view similar to Fig. 1 at right angles thereto, and Fig. 4 a plan view.

In the practice of my invention I provide a discharge-nozzle which comprises a short tube A, which is provided with a tubular end section B, the inner walls of which are screw-threaded, whereby the nozzle is adapted to be secured to a water-supply pipe, and the tube A is preferably conical in form or slightly contracted from the section B outwardly, and said tube A is also provided at its outer end with a head or casing D, which is rectangular and oblong in cross-section and which constitutes the nozzle proper and the side walls of which are flat and parallel and the end walls of which diverge outwardly, as clearly shown in Fig. 3.

Pivoted within the head or casing D, adjacent to one of the parallel sides thereof, is a valve G, which is similar in form to one side of the box or casing D, and said valve is mounted on a shaft $g$, which extends through the ends of the casing and which is provided with an arm $g^2$, which projects backwardly and which is adapted to operate in connection with a rack-bar K, secured to or formed on the side of the tube A.

The shaft $g$ and the arm $g^2$ thereof are composed of heavy spring-wire, and the operation is such as to press the arm at all times in contact with the rack-bar K, and the position of the valve G may be regulated to any desired point by simply adjusting the arm $g^2$ on the rack-bar K, as will be readily understood.

The casing or head D constitutes the discharge-nozzle proper, and by means of the shape thereof and the valve G, which is hinged or pivoted therein, it will be apparent that a sheet of water may be discharged therefrom in any desired volume or thickness, the thickness of said sheet being regulated by the valve G, and, as will be also apparent, the sides or edges of said sheet will be thrown outwardly in diverging lines which constantly widen and spread, this result being accomplished by the shape of the head or casing D. It will also be observed that the inner end of the head or casing D is much larger than the discharge-orifice $a$ through the tube A, and this feature of construction also aids in spreading or spraying water as it is discharged from the head or casing D.

My improved nozzle will throw the stream or sheet of water or spray the same, if desired, and there is but little back pressure in the pipe to which it is secured, and the device is simple in construction and operation and perfectly adapted to accomplish the result for which it is intended, while also being comparatively inexpensive.

Having fully described my invention, I claim as new and desire to secure by Letters Patent—

1. A fountain or spraying nozzle, which consists of a tube which is adapted to be connected with a water-pipe, said tube being provided with a head or casing which constitutes the nozzle proper, and is oblong in form and rectangular in cross-section, the wider sides thereof, being flat and parallel and the narrow sides or ends being outwardly inclined or divergent, and a valve which is pivoted therein, and which is of substantially the same form as the sides of the head or casing, and means for operating said valve, substantially as shown and described.

2. A fountain or spraying nozzle, which consists of a tube which is adapted to be connected with a water-pipe, said tube being provided with a head or casing, which constitutes the nozzle proper, and which is oblong in form and rectangular in cross-section, the wider sides thereof, being flat and parallel, and the narrow sides or ends being outwardly inclined or divergent, and a valve which is pivoted therein, and which is of substantially the same form as the sides of the head or casing, and means for operating said valve, consisting of an arm, which forms a part of the shaft on which the valve is mounted, and which extends through one of the diverging sides of the head or casing and backwardly adjacent to the tube to which the nozzle is secured, and a rack-bar formed on or secured to said tube in connection with which said arm operates, substantially as shown and described.

In testimony that I claim the foregoing as my invention, I have signed my name, in presence of the subscribing witnesses, this 7th day of March, 1896.

CHARLES PITT GILMORE.

Witnesses:
HUGH W. WARNER,
JOHN F. BROWN.